F. A. BRUCKMAN.
AUTOMATIC PASTRY MAKING MACHINE.
APPLICATION FILED MAY 11, 1910.
1,071,027.
Patented Aug. 26, 1913.
6 SHEETS—SHEET 1.
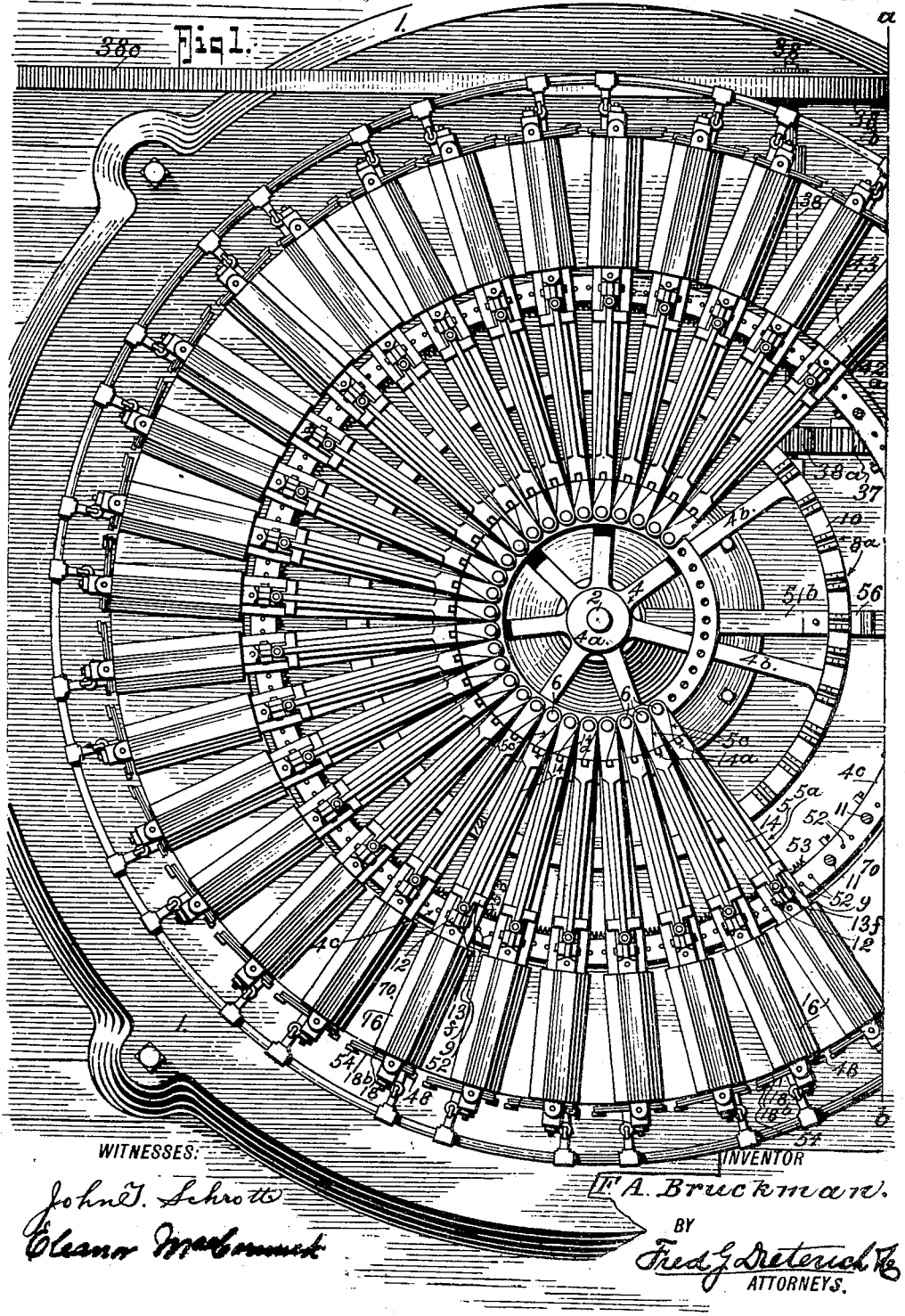

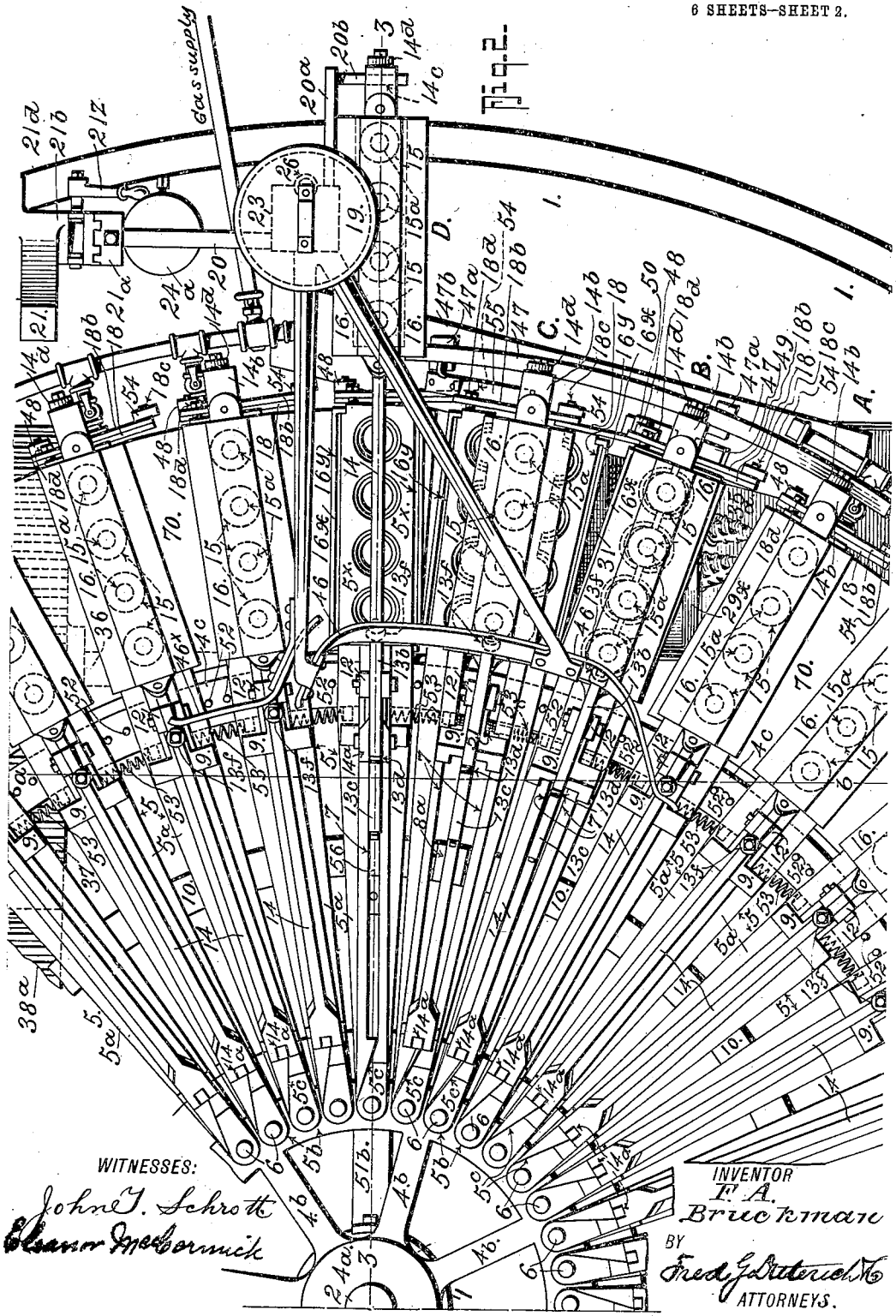

F. A. BRUCKMAN.
AUTOMATIC PASTRY MAKING MACHINE.
APPLICATION FILED MAY 11, 1910.
1,071,027.
Patented Aug. 26, 1913.
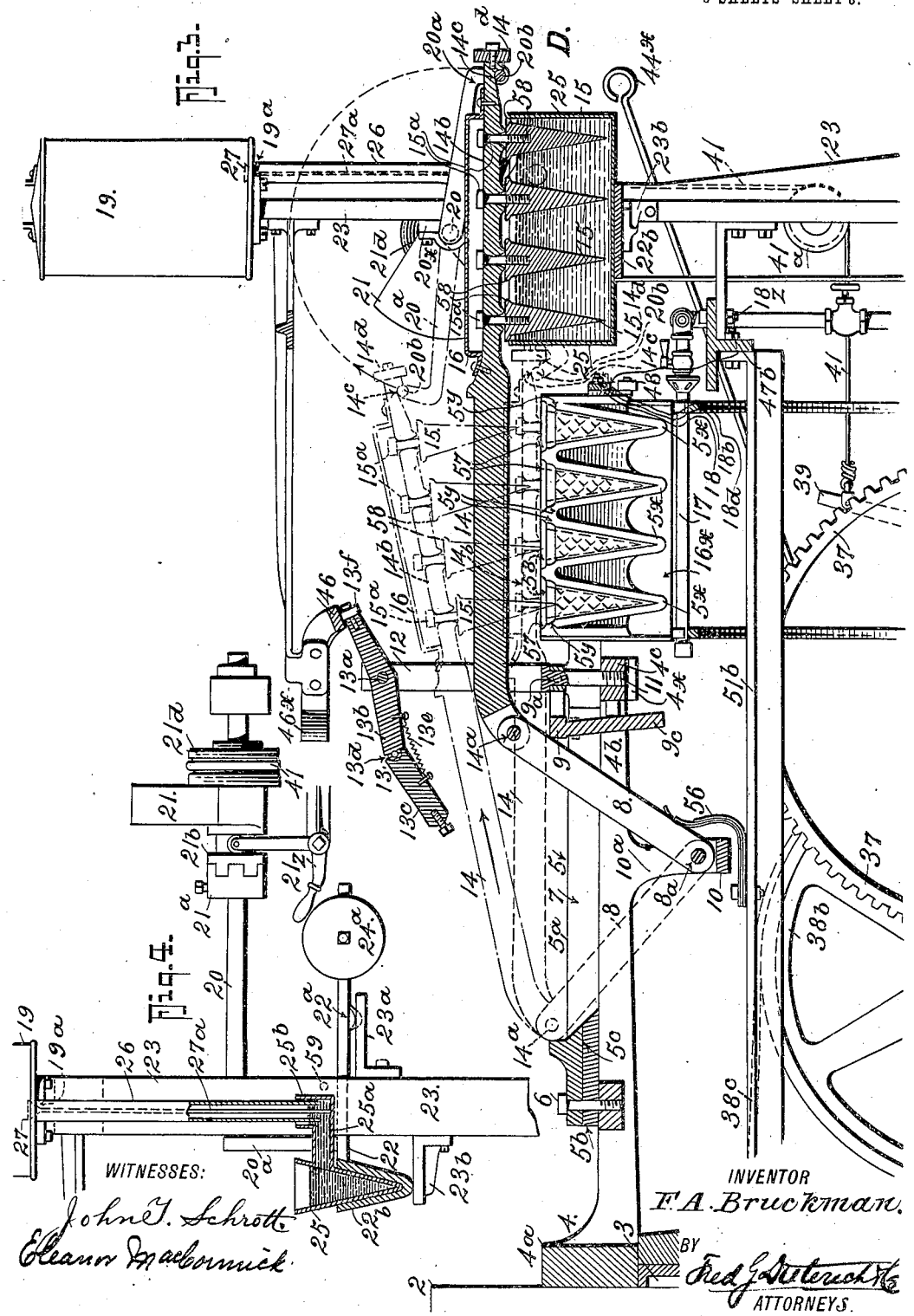
WITNESSES:
John T. Schrott
Eleanor MacCormick
INVENTOR
F. A. Bruckman.
BY
Fred G. Dieterich
ATTORNEYS.

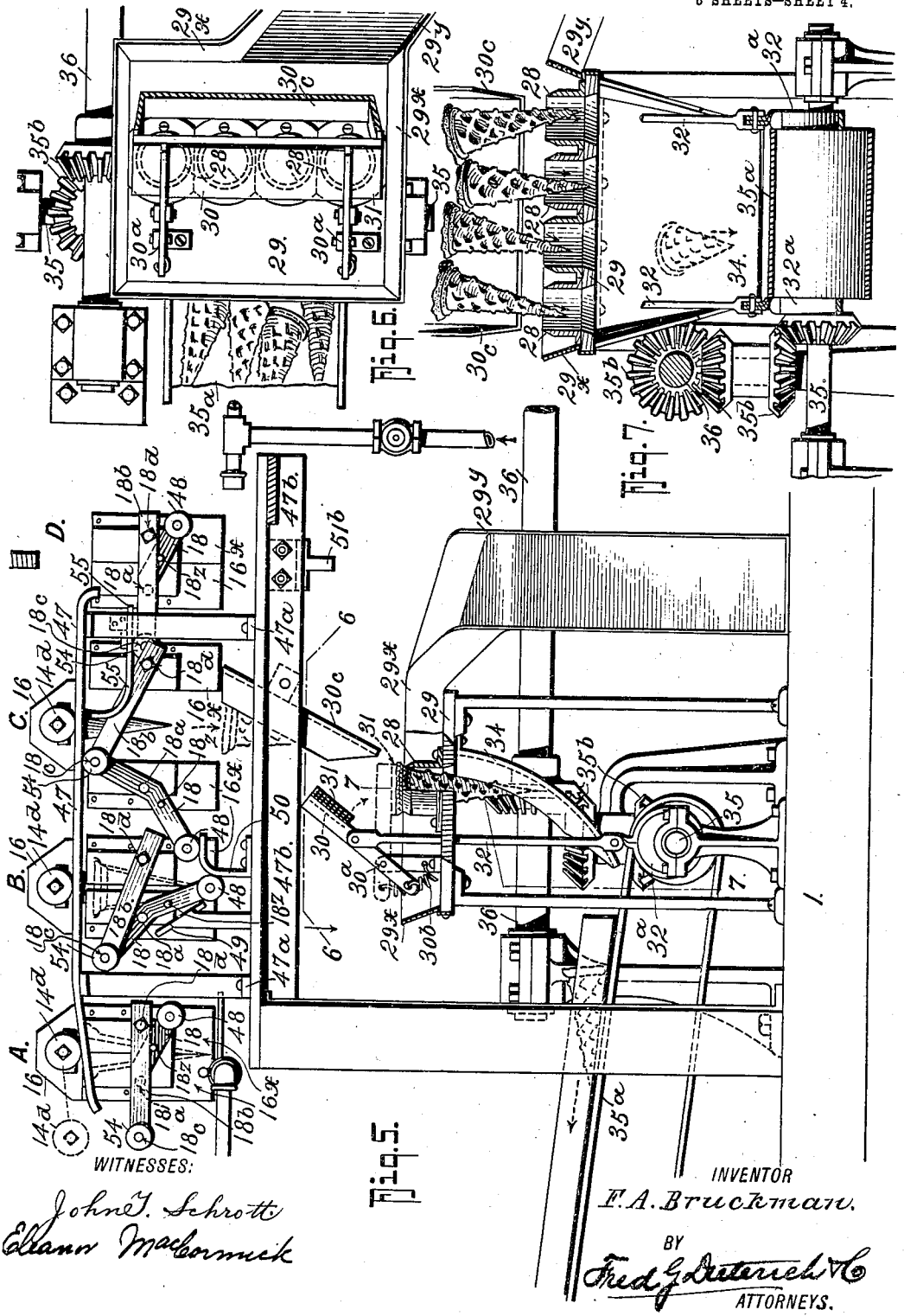

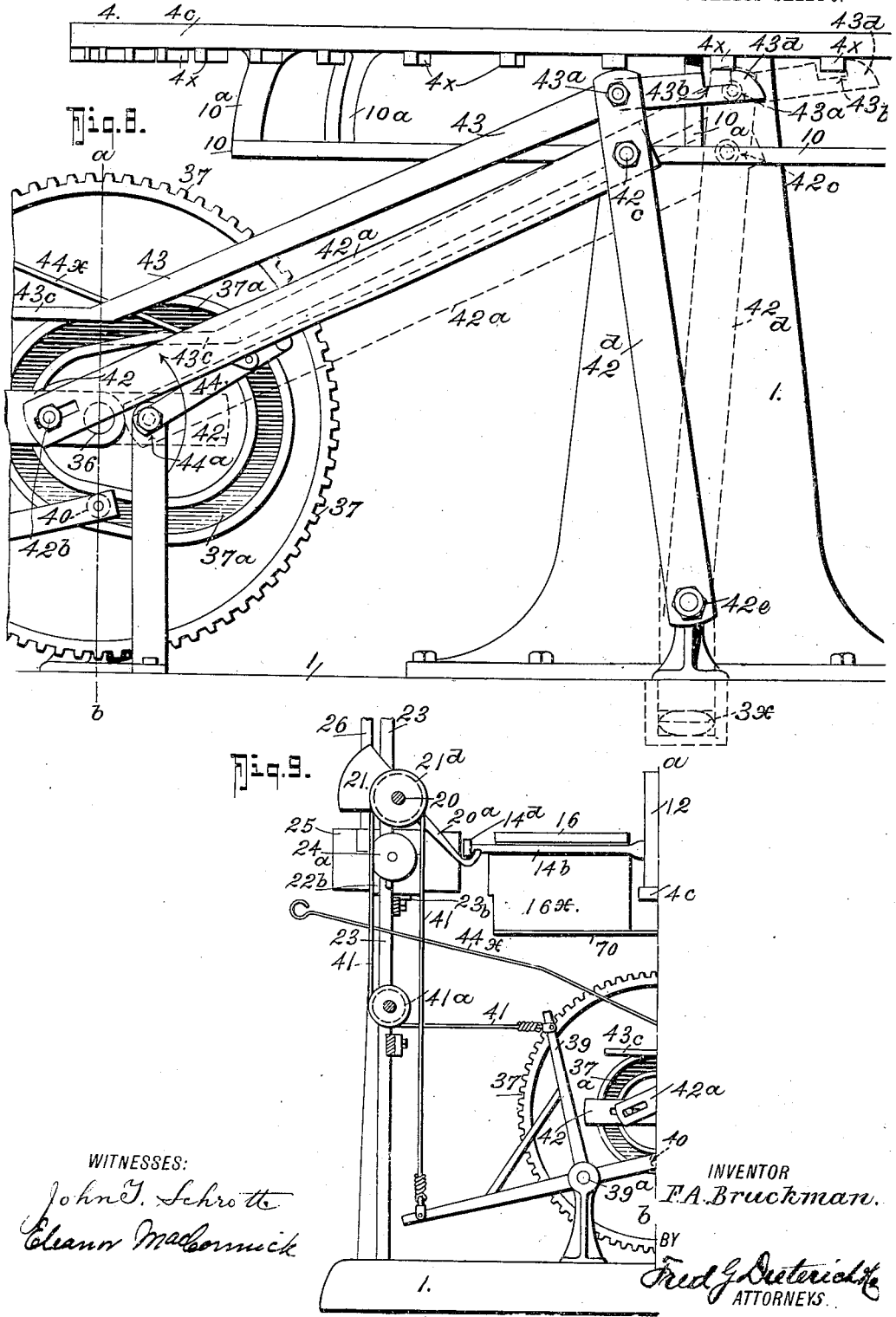

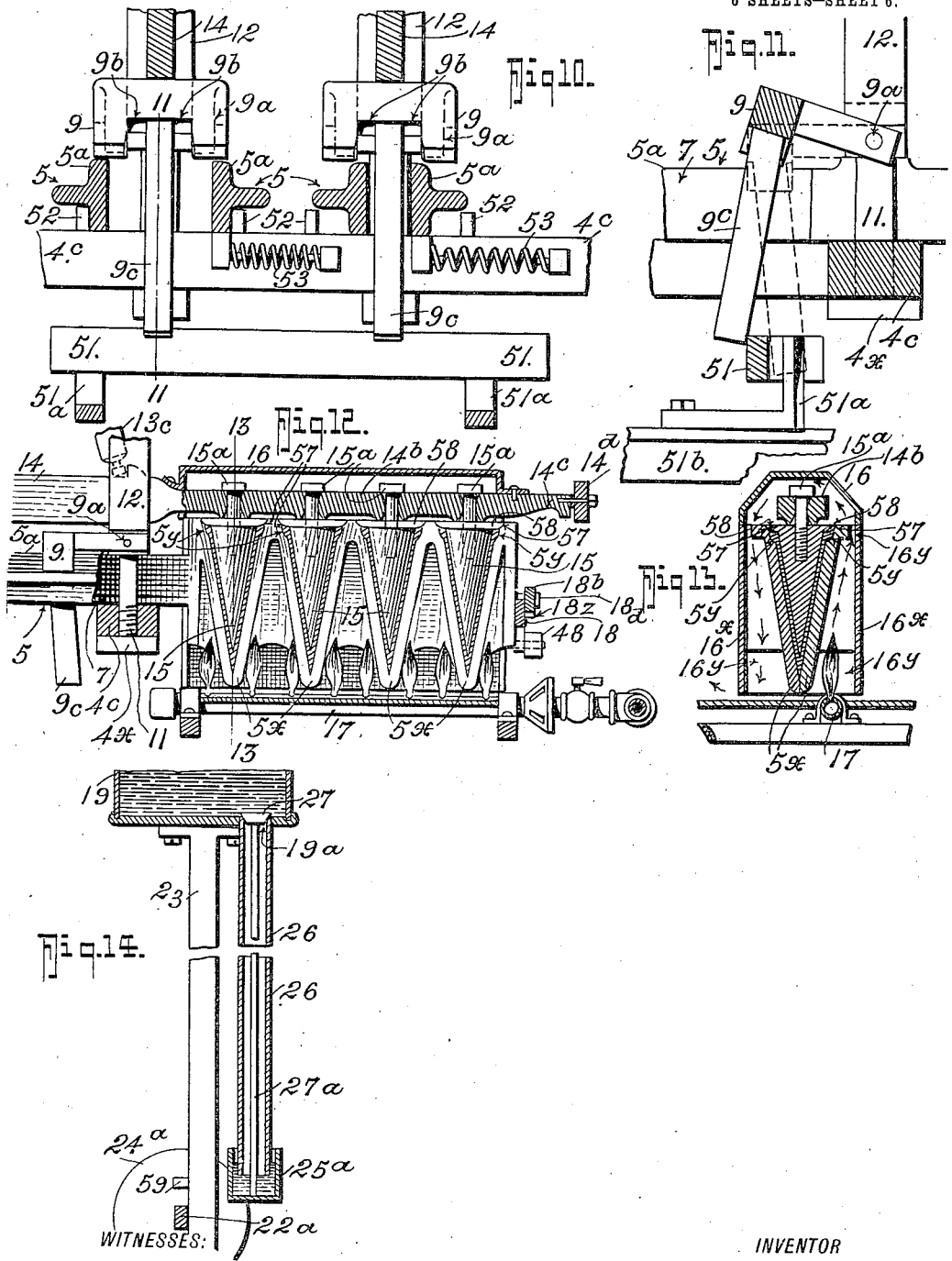

UNITED STATES PATENT OFFICE.

FREDERICK A. BRUCKMAN, OF PORTLAND, OREGON.

AUTOMATIC PASTRY-MAKING MACHINE.

1,071,027.  Specification of Letters Patent.  Patented Aug. 26, 1913.

Application filed May 11, 1910. Serial No. 560,568.

*To all whom it may concern:*

Be it known that I, FREDERICK A. BRUCKMAN, residing at Portland, in the county of Multnomah and State of Oregon, have invented certain new and useful Improvements in Automatic Pastry-Making Machines, of which the following is a specification.

My invention relates to that class of pastry making machines in which hollow articles are molded between dies, and it more particularly relates to that class of machines which are particularly adapted for making ice cream cones and other similar articles.

Generically the invention provides a turn-table or wheel that carries the molding dies and their coöperating parts, beneath which wheel the heaters for burners or the ovens are located, and beneath which the mechanism for imparting a step-by-step movement to the table is also located.

The invention also includes a mechanism for removing the cores from the female dies or molds at proper intervals, carrying them over the dough supply or dipping tank, dipping them into the dough and then returning the cores to the mold. Locking devices, automatic in their operation, are provided for locking the sectional molds or dies together during a predetermined time, while other automatically operated locking devices lock the cores in the dies during the time they are located in such position. The molds or dies are inclosed in ovens which are also a part of my invention and are so constructed as to conserve the heat and to evenly distribute the same over the molds to insure even baking, without interfering with the operation of opening and closing the sectional molds. Means are also provided for trimming the surplus dough from the baked cones when they are discharged from the molds and before they are delivered from the machine.

My invention includes a means for automatically maintaining a constant supply of dough in the dipping tank.

In its more specific nature, the invention also includes those novel details of construction, combination and arrangement of parts, all of which will be first fully described, and then be specifically pointed out in the appended claims, reference being had to the accompanying drawings, in which:

Figure 1, is a top plan view of my machine, parts being cut away, and other parts being removed to more clearly show some of the parts beneath those parts removed. Fig. 2, is an enlarged detail top view of a part of the mechanism corresponding to that part incompletely shown at the right of Fig. 1 of the drawings, the line $a$—$b$, each of Figs. 1 and 2 being the same. Fig. 3, is a central vertical longitudinal section on the line 3—3 of Fig. 2. Fig. 4, is a detail front elevation and part section of the dipping tank and its parts. Fig. 5, is a front elevation and part section of the mold showing the means for opening and closing the front latches and also showing the trimming mechanism. Fig. 6, is a detail top plan and section on line 6—6 of Fig. 5. Fig. 7, is a detail section on the line 7—7 of Fig. 5. Fig. 8, is an enlarged detail view of the step-by-step feeding machine for the table, a part of the mechanism being removed. Fig. 9, is a detail view of the core removing, dipping and returning mechanism, this view being readable with Fig. 8 by considering the lines $a$—$b$ of Figs. 8 and 9 as the same. Fig. 10, is a detail view showing the inner locking mechanism for the two-part molds or die carriers. Fig. 11, is a section on the line 11—11 of Fig. 10. Fig. 12, is a detail vertical longitudinal section of a part of one of the dies. Fig. 13, is a cross section on the line 13—13 of Fig. 12. Fig. 14, is a detail view of the valve for controlling the flow of dough from the reservoir.

Referring now to the accompanying drawings in which like letters and numerals of reference indicate like parts in all the figures, 1 designates the main frame which has bearings 3—3$^x$ to support the central shaft 2 which carries the turn-table or wheel 4, whose hub 4$^a$ is keyed or otherwise rigidly secured to the shaft 2. The wheel 4 carries the female mold or die carriers 5$^a$, which are formed in half sections and are hinged together by pins 6 secured to the wheel 4. Each mold section has its pivot end 5$^b$ cut to form shoulders or sockets 5$^c$ which prevent the mold sections 5 from meeting. Each female mold section also includes the arms 5$^a$ which are cut away to leave a slot 7 and permit a slight amount of resiliency to reside in such arms 5$^a$, for a purpose which will hereinafter be more clearly understood. At the ends of the arms 5$^a$ are the female molds proper, each of which is of like form and has as many compartments or die sections as may be desired, four being shown in the drawings.

A ring 10 is suspended beneath the wheel proper 4, by brackets 10ᵃ that depend from the spokes 4ᵇ. On the rim 10 a set of links are pivoted at 8ᵃ, one for each set of molds and the links 8 project up through their respective slots 7 and operate therein.

12 designates forks whose lower ends are reduced and tapped at 11 into the peripheral rim 4ᶜ of the wheel 4 and form a center guide for the female mold sections as well as a support to which the inner latches 9 are fulcrumed at 9ᵃ. The forks 12 support the latches 13 for the male die sections and serve as guides for the bars 14 thereof. The bars 14 are hinged at 14ᵃ to the respective links 8 and have heads 14ᵇ that carry the male dies or cores 15 and the oven caps or hoods 16, as will hereinafter more fully appear. Each latch 13 is pivoted at 13ᵃ near the upper end of the respective fork 12 and is composed of two sections, the lever section 13ᵇ and the finger 13ᶜ which is pivoted thereto at 13ᵈ and tends continuously to move in one direction under the influence of a spring 13ᵉ. The lever portion 13ᵇ of each latch 13 at its free end carries a roller 13ᶠ to engage the track 46 that serves to release the latches 13 during a proper interval of the operation of the machine and to engage the track 46ˣ that restores the latches 13 to their latching position.

Each female mold section has one or more suitable half dies 5ˣ, whose inner surface is roughened to retain the cone after it is baked and molded and while being released from the male die or core 15. Each die section 5ˣ has a double grooved mouth 5ʸ—57, the latter groove 57 receiving the collar 58 of the corresponding core 15 to effect a closure of the female die. Each die section 5ˣ also carries one-half of an oven 16ˣ, whose hood 16 is carried on the male die carrier 14, before referred to. The side walls of the oven 16ˣ are spaced from the dies to afford passages 16ʸ for the heat, as best shown in Fig. 13 of the drawings. The cores 15 are swivelly connected to the head 14ᵇ at 15ᵃ by a ball-like joint. The latches 9 have notches 9ᵇ (Fig. 10) to rest over the arms 5ᵃ of the mold sections and hold them together after they have been drawn together in a manner hereinafter referred to. Springs 53 connect to one of the female die sections of each set and to the wheel rim 4ᶜ to continuously tend to hold those sections against the stop pins 52, provided on the wheel rim 4ᶜ to arrest the movement of the female die sections. Those of the die sections having no springs 53 are moved by a special mechanism, hereinafter described. The latches 9 have pendent members 9ᶜ that project downwardly through the slots 7 and are engaged by a track 51 at the proper time to release the latch heads from engagement with the die arms to release the same while the molds are being emptied. The track 51 is suitably supported on standards 51ᵃ secured to a beam 5ᵇ beneath the wheel 4. Each male die head has at its free end a notch 14ᵉ on its under side and it also carries a roller 14ᵈ to ride on the track 47 that is provided for slightly lifting the cores from the female dies to cause them to disengage the cones before the cones are released from the dies and dropped to the trimming mechanism. The track 47 is supported on standards 47ᵃ that are carried on the bracket 47ᵇ and assists in maintaining the beam 51ᵇ in place. After the latches 9 are released, the molds are opened by the spring 53 and by a mechanism best shown in Figs. 2 and 5, by reference to which it will be seen that on front of each of the mold sections to which the springs 53 are connected, is a lever 18 that is pivoted at 18ᵃ, the lever 18 having rolls 48 and 54 at each of its ends. The levers 18 connect to the opposite molds by links 18ᵇ that are pivoted at one end to the upper end of the levers 18 at 18ᵈ and are pivoted at 18ᶜ to their respective mold sections. Stops 18ᶻ are provided on the levers 18 to limit the movement of the levers and the links when moved toward their normal or latching position. The female molds are opened when the rolls 48 engage the guides 49 and 50 on the bracket 47ᵇ and are closed when the molds engage the guide 55 on the support 47ᵃ as will be hereinafter more fully understood.

There are four positions where the male and female molds are undergoing movement relatively to one another and these positions are designated A, B, C and D in Figs. 2 and 5 of the drawings. At all the other positions the molds or die parts are locked together and move as one. The track 47 extends from position A to position C and performs its function between these positions. The opening guides 49 and 50 come into operation after the respective molds have left position A, and continue to perform their function until the molds leave position C. The closing die 55 comes into operation at position C and remains in operation until the dies leave position D. The latches 9 are released as the dies or mold reach position A and do not again resume their latching position until the female molds are closed at position D, the track or guide 51 coming into operation at position A, and terminating its function between positions C and D. The track or guide 46 comes into play just before position A is reached and terminates its function just after position D is past, whereupon the guide 46 comes into play to set the latches 13. At position C the unloading of the molds and discharge of the baked product takes place and at position D the re-loading of the molds is accomplished by mechanism hereinafter to be explained. As the baked cones are released at position C they drop on a chute 30$^c$ that conveys them to the trimming mechanism, also to be hereinafter explained.

Burners 17 are located beneath the molds at each position of their travel except positions B, C and D, and are arranged alternately, that is to say they are arranged so that their heat is applied first to one side of the dies and then to the other side, as the wheel carries them around the circle.

Mechanism for supplying dough to the molds is best illustrated in Figs. 2, 3, 4 and 9 of the drawings, by reference to which it will be observed that upon a suitable support 23 is located the dough reservoir 19 that has an outlet 19$^a$ governed by a valve 27 whose stem 27$^a$ extends downwardly through the off-take pipe 26 to the bottom thereof. A suitable frame 22 is pivoted at 22$^a$ on the bracket 23$^a$ secured to the support 23 and carries an adjustable counterweight 24$^a$ to counter-balance the weight of the dipping tank 25 that is removably held in the pocket 22$^b$ of the frame 22. Movement of the frame 22 under the influence of the weight 24$^a$ is arrested by a stop 59 and is normally adjusted so that the pocket 22$^b$ will rest lightly on the table 23$^b$. The dipping tank 25 has a spout 25$^a$ having an up-turned end 25$^b$ into which the pipe 26 projects and has a sliding movement therein. Mounted in bearings 20$^x$ is a rock shaft 20 having an arm 20$^a$ provided with a finger 20$^b$ to engage the notches 14$^c$ in the heads of the male die carrier arms. The shaft 20 has a fixed clutch member 21$^a$ and a loose clutch member 21$^b$, which member 21$^b$ is shiftable by suitable lever devices 21$^z$ and is also provided with a counterweight 21, as indicated. The member 21$^b$ also has a pulley portion 21$^d$ over which the cable 41 is wound. The cable 41 passes over an idler 41$^a$ (see Fig. 9) and has its ends secured to a rocker frame 39 which is pivoted at 39$^a$ to a support and carries a roller 40 that is held in the cam groove 37$^a$ of a gear 37 on the main shaft 36. The main shaft 36 is driven from the driving shaft 38 by a pinion 38$^a$, and the driving shaft 38 gets power by a pulley 38$^b$ and belt 38$^c$, or otherwise, from any source not shown. The shaft 36 in turning causes the rocker frame 39 to oscillate at proper intervals, thereby causing the shaft 20 to rock. The movement of the shaft 20 brings the finger 20$^b$ beneath the head 14$^b$ of the male mold section into alinement therewith at position B, and entering the notch 14$^c$ thereof raises the cores out of the molds (see Fig. 3) and moves them upwardly and outwardly over the tank 25 and then downwardly to dip the cores 15 into the dough in the tank 25, as shown in full lines in Fig. 3, after which the movement of the shaft 20 is reversed and the molds or cores 15 are lifted from the tank 25 with the dough adhering thereto, and returned to the female mold. In order to counterbalance the weight of the links 8 and the part carried thereby in dipping the cores, a leaf spring 56 is held to be engaged by the respective links when they move from the position shown in dotted lines in Fig. 3 to the position shown in full lines in the same figure. Thus the spring 56 holds the notch 14$^c$ always over the finger 20$^b$ and prevents slipping of the parts.

The mechanism for imparting a step-by-step movement to the wheel 4, is best shown in Figs. 8 and 9 of the drawings. It will be seen that the under face of the rim 4$^c$ has blocks 4$^x$ at suitable intervals. On the end of the main shaft 36 is a crank 42 to which the pitman 42$^a$ is pivoted at 42$^b$. The pitman 42$^a$ is also pivoted at 42$^c$ to a rocker arm 42$^d$ that is in turn pivoted at 42$^e$ and carries the latch bar 43. The bar 43 is pivoted at 43$^a$ to the arm 42$^d$ at its upper end. The latch bar 43 has a notch 43$^b$ in its front end and has a heel 43$^c$ at its rear end with which the crank 42 engages to lower the clutch end 43$^d$ from engaging the wheel blocks 4$^x$ on the return stroke of the pitman 42$^a$. The foregoing constitutes the step-by-step feeding mechanism which will, as the shaft 36 turns, cause the arm 42$^d$ to be rocked and the clutch bar to alternately engage and disengage the wheel and move it forward step-by-step on the forward stroke of the pitman 42$^a$ to turn the wheel in a counter-clockwise direction in Figs. 1 and 2. In order to render the feeding mechanism inoperative when desired, it only requires that the bar 43 be prevented from interlocking with the wheel 4 and this is done by a lever 44 pivoted at 44$^a$ and movable under the heel 43$^c$ by a rod 44$^x$ to prevent the crank 42 from engaging the heel 43$^c$.

When the cones are discharged from the molds at position C they descend into the trimming mechanism where the rough edges of the mouths are taken off and this mechanism is best disclosed in Figs. 5, 6 and 7 of the drawings, from which it will be noted, suitable tubes 28 are supported on a platform 29 and have their upper edges sharpened to trim the edges of the cones as they pass through the tubes. As the cones are chuted into the tubes 28 they will hang until trimmed. In order that the trimming operation may be completed, a plate 30 is pivoted at 30$^a$ to a support and held up by a spring 30$^b$. The plate 30 has a soft rubber cushion 31 which engages the cones in the tubes 28 and pushes them through. When the plate 30 is moved to cause the cushion 31 to engage the cone, as shown in dotted lines in Fig. 5, it thereby causes the sharpened edges of the tubes 28 to sever the projected parts of the cones, which parts thereupon fall into the pan 29$^x$ and may be chuted at 29$^y$ to any desired place. The movement of the plate 30 is effected at intervals by a suitable mechanism, such as indicated in the drawings. Rods 32 and cams 32$^a$ on the shaft 35 serve to operate the plate 30, the shaft 35 being driven from the main shaft 36 by gearing 35$^b$, as shown in Fig. 7.

A conveyer 35$^a$ driven from the shaft 35 receives the cones from the chute 34 and carries them to the outside of the machine, where they may be delivered into any suitable receptacle (not shown).

Having thus described the construction of my invention and indicated the operation in a more or less general way, a more detailed description of the operation of the machine is now in order.

Assume power to be applied to the belt 38$^c$ to set the shaft 36 in motion thereby causing a step-by-step movement to be imparted to the wheel 4, as before described. Assume also that dough is in the reservoir 19, the tank 25 being full, valve 27 closed, burners 17 being lighted, and wheel 4 at one of its rest positions. Assume also that the mold at position D has just arrived at that place and the female mold sections thereof are locked together. As the shaft 36 turns and the shaft 20 is rocked as heretofore described, the finger 20$^b$ is now brought into engagement with the notch 14$^c$ of the head 14 at position D, when the parts are now positioned as shown in dotted lines in Fig. 3. The arm 20$^a$ now raises the male mold or core 15 out of the female mold (see dot and dash lines Fig. 3) and moves through the arc indicated in such figure, moving the arm 14 in the direction of its arrow in Fig. 3 to thereby cause the pivot 14$^a$ to rise as the link 8 moves over toward the position shown in full lines in Fig. 3. When the cores 15 are carried over the tank they are lowered therein and a quantity of dough adheres to each of them, whereupon the movement of the shaft 20 is reversed and the cores 15 are returned to the female dies, as shown in dotted lines in Fig. 3, closing the molds and squeezing the dough into place therein. The dipping of the cores 15 into tank 25 and the consequential removal of the dough therefrom causes the weight 24 to raise the tank 25, thereby opening the valve 27 and allowing dough to flow into the tank 25 until its level therein is restored, whereupon the valve 27 closes off the flow of dough. The core 15 has thus been dipped and returned to the molds 5. The wheel 4 is now moved forward step-by-step over the burner 17 to bake the dough as the molds move from position D over the burners, the latch 13 will disengage the track 46 and be straightened out, to lock the male section of the molds in place, by the guides 40. The molds are now moved step-by-step around the circle from position D to position A, during which time the baking operation is taking place. When the mold reaches the position just in advance of position A the latch roller 13$^f$ engages the track 46 and releases the latch 13 from the male section of the die. When the mold reaches the position A, the roller 14$^d$ on the end of the carrier will ride up on the track 47 to slightly raise the cores 15 out of the mold 5, the swivel ball connection between cores 15 and the head 14$^b$ being such that this movement may take place without disturbing the centering of the cores 15 in the cone. This raising of the cores releases them from the baked cone. During the next step of movement of the wheel the mold at position A moves to position B, and in so doing the latch 9 is released and the lever 18 engages the guides 49 and 50 to begin to open the mold 5 for the purpose of releasing the baked cone. In passing from position B to position C the mold is fully opened and the cones drop onto the chute 30$^c$ from whence they pass to the trimming mechanism and are trimmed as before described. The next step brings the mold from position C to position D, during which movement the sections of the female mold are again locked together as before described and the foregoing cycle of operation is repeated. It will be observed the entire operation of the machine from the time the batter is placed in the reservoir 19 until the finished product leaves the conveyer 35, is entirely automatic and does not require any manual help. The construction of the oven 14$^x$ and its cap 16 is such that the heat is retained as much as possible while still allowing ample draft from the burners and by alternately heating first one side of the molds 5 and then the other, an even baking action is had.

If it is desired not to dip the cones the clutch 21$^b$ is thrown out of mesh when the dipping cranks will remain at rest and the end of the bar of the male section of the mold passes over it without dipping of the core. If it is desired to stop the wheel 4 and its molds the latch of the step-by-step operating mechanism is thrown out of mesh and the wheel will remain at rest.

The advantages of my machine are in providing an automatic machine for making cones, wafers and other pastry, that is operated automatically; the shaft running at a regular speed, dipping the cores, allowing each the same time in the batter, which being of a uniform consistency and automatically kept at a uniform depth in the dipping tank insures each core being coated to the same thickness with the batter just the required amount to make the cone, the space between the female section of the dies and the cores being closed by a ball or swivel joint, causing sufficient resistance to form a full rim at the top of the cone without any waste of batter, the automatic locking of these dies and cores together, and passing them around over the gas burners. The molds being provided with a hood or oven to retain the heat, and each mold receiving the same heat for the same period of time, the batter in each mold is baked uniformly. The heat is regulated so that the baking operation will take place at the required time.

Another advantage of my invention resides in the automatic unlocking and opening of the molds, dropping the cones out, and automatically trimming the surplus dough off the rim and the top if there is any, and again closing and locking the molds, dipping the cores and locking them in the mold and so on, operating each and every mold in substantially the same manner as described.

Further advantages of my invention lie in providing an automatic machine whose dipping tank is arranged so that the batter is automatically kept at a given depth; a machine whose cores are automatically dipped into the batter a given length of time and to a given depth; coating them uniformly; a machine whose dies and cores are provided with a ball joint to insure perfect cones and preventing the waste of material; automatically locking the molds firmly together and subjecting each and every one of them to the same heat for the same length of time, thereby baking the pastry uniformly in all the molds; a machine whose molds are provided with a hood or oven covering the entire dies, and cores, retaining all the heat and heating both dies and cores uniformly; and reducing the fuel consumption to a minimum; a means for automatically unlocking the molds, dropping the cones out and trimming the rims and conveying them to a place to be packed.

From the foregoing description taken in connection with the accompanying drawings it is thought the complete construction, operation and advantages of my invention will be readily understood by those skilled in the art to which the invention appertains.

What I claim is:

1. In an apparatus of the character stated, a horizontally rotatable wheel, a plurality of sets of molding devices carried on said wheel, means for loading said molding devices as they arrive at a predetermined place, means for baking the contents of said molding devices when loaded, said baking means including an individual oven for each set of molding devices and a common set of burners for all of the ovens, and means for discharging the molded product from said molding devices after said product has been molded and baked.

2. In a machine of the class described, a rotatable wheel, molding devices carried by said wheel, means for loading said molding devices as they arrive at a predetermined place, means for discharging the molded product from said molding devices after said product has been molded thereby, and means for trimming the product after it leaves the molding devices and means for delivering it from the machine.

3. In an apparatus of the character stated, a rotatable wheel, molding devices carried by said wheel, means for loading said molding devices as they arrive at a predetermined place, means for baking the contents of said molding devices when loaded, means for discharging the molded product from said molding devices after said product has been molded and baked, and means for trimming the product as it leaves the molding devices and means for delivering it from the machine.

4. In a machine of the character stated, a rotatable wheel, molding devices carried by said wheel, each of said molding devices comprising female molds and removable cores therefor, a dipping tank, means for removing said cores from said molds, dipping them in said dipping tank and then returning said cores to said molds, means for turning said wheel and means for discharging the contents of said molding devices.

5. In a machine of the class described, a step-by-step rotatable wheel, a plurality of sets of molding devices carried by said wheel and including female molds and cores therefor, a stationarily held tank for the substance to be molded, means for transferring the cores from the female molds into the tank and back again to transfer the moldable substance from said tank to said female molds as said molding devices pass said tank to load said molding device, and means for discharging the molded product from said molding devices at a predetermined place.

6. In a machine of the class described, a horizontally rotatable frame, a plurality of sets of molding devices each including a pair of female molds pivoted to said frame, means for locking and unlocking said female molds at intervals, and cores for said female molds, core carriers for said cores, a relatively stationarily located dipping tank for the substance to be molded, means for engaging said core carriers and lifting said cores out of said female molds and transferring said cores into said tank and then back into said female molds as said molding devices pass said tank to load said molding devices, and means for discharging the molded product from said molding devices at predetermined places.

7. In a machine of the class described, an automatically actuated step-by-step rotatable wheel, molding devices carried by said wheel, a stationarily held tank for the substance to be molded, means for transferring the moldable substance from said tank to said molding devices as said molding devices pass said tank to load said molding devices, means for discharging the molded product from said molding devices at a predetermined place, and means for applying heat to said molding devices during their movement between the position at which they are loaded and the position at which they are unloaded.

8. In a machine of the class described, a rotatable wheel, molding devices carried thereby, each of said molding devices including a pair of female mold sections and a removable core section therefor, means for locking said female mold sections together, a dipping tank for containing the moldable product, and means for removing said cores from said mold sections, dipping them into said dipping tank and restoring them to said mold sections as said molding devices pass said dipping tank.

9. In a machine of the class described, a rotatable wheel, molding devices carried thereby, each of said molding devices including a pair of female mold sections and a removable core section therefor, means for locking said female mold sections together, a dipping tank for containing the moldable product, means for removing said cores from said mold sections, dipping them into said dipping tank and restoring them to said mold sections as said molding devices pass said dipping tank, and means for unlocking said mold sections at a predetermined position to discharge the contents thereof.

10. In a machine of the class described, a rotatable wheel, molding devices carried thereby, each of said molding devices including a pair of female mold sections and a removable core section therefor, a dipping tank for containing the moldable product, means for removing said cores from said mold sections, dipping them into said dipping tank and restoring them to said mold sections as said molding devices pass said dipping tank, means for unlocking said mold sections at a predetermined position to discharge the contents thereof, and means for trimming the discharged contents of said molds and delivering the same from the machine.

11. In a machine of the class described, a rotatable wheel, molding devices carried thereby, each of said molding devices including a pair of female mold sections and a removable core section therefor, means for locking said female mold sections together, a dipping tank for containing the moldable product, means for removing said cores from said mold sections, dipping them into said dipping tank and restoring them to said mold sections as said molding devices pass said dipping tank, each of said molding devices also including an individual oven, and means for applying heat to said oven during predetermined times.

12. In a machine of the class described, a rotatable wheel, molding devices carried thereby, each of said molding devices including a pair of female mold sections and a removable core section therefor, means for locking said female mold sections together, a dipping tank for containing the moldable product, means for removing said cores from said mold sections, dipping them into said dipping tank and restoring them to said mold sections as said molding devices pass said dipping tank, each of said molding devices also including an individual oven, and means for applying heat alternately first to one side and then to the other side of said oven during a predetermined time.

13. In a machine of the class described, a rotatable wheel, molding devices carried thereby, each of said molding devices including a pair of female mold sections and a removable core section therefor, means for locking said female mold sections together, a dipping tank for containing the moldable product, means for removing said cores from said mold sections, dipping them into said dipping tank and restoring them to said mold sections as said molding devices pass said dipping tank, each of said molding devices also including an individual oven, means for applying heat to said ovens during predetermined times, and means for unlocking said female mold sections as they arrive at a predetermined place to discharge the contents thereof.

14. In a machine of the class described, a rotatable wheel, molding devices carried thereby, each of said molding devices including a pair of female mold sections and a removable core section therefor, means for locking said female mold sections together, a dipping tank for containing the moldable product, means for removing said cores from said mold section, dipping them into said dipping tank and restoring them to said mold sections as said molding devices pass said dipping tank, each of said molding devices also including an individual oven, means for applying heat alternately first to one side and then to the other side of said ovens during a predetermined time, and means for unlocking said female mold sections as they arrive at a predetermined place to discharge the contents thereof.

15. In a machine of the character stated, a rotatable wheel, a molding device carried by said wheel, said molding device including a female mold and a removable core therefor, a tank for containing the substance to be molded, said tank being located at a predetermined place, and means for removing said core from said mold and dipping it into said tank, and then restoring it to said mold as said mold passes said tank.

16. In a machine of the character stated, a rotatable wheel, a molding device carried by said wheel, said molding device including a female mold and a removable core therefor, a tank for containing the substance to be molded, said tank being located at a predetermined place, means for removing said core from said mold and dipping it into said tank and then restoring it to said mold as said mold passes said tank, and means causing said molding devices to discharge its finished product at a predetermined place.

17. In a machine of the character stated, a rotatable wheel, a molding device carried by said wheel, said molding device including a female mold and a removable core therefor, a tank for containing the substance to be molded, said tank being located at a predetermined place, means for removing said core from said mold and dipping it into said tank and then restoring it to said mold as said mold passes said tank, means causing said molding device to discharge its finished product at a predetermined place, and means for heating said mold after its core has been dipped and before the finished product is released from said mold.

18. In machine of the character stated, a rotatable wheel, molding devices carried by said wheel, said molding devices including cores, a dipping tank at a predetermined place, means for dipping said cores into said tank as said molding devices arrive at said predetermined place to load said molding devices, means for unloading said molding devices as they arrive at another predetermined place, and means for maintaining a constant supply of moldable substance in said dipping tank.

19. In a machine of the character stated, a rotatable wheel, molding devices carried by said wheel, said molding devices including cores, a dipping tank at a predetermined place, means for dipping said cores into said tank as said molding devices arrive at said predetermined place to load said molding devices, means for unloading said molding devices as they arrive at another predetermined place, means for maintaining a constant supply of moldable substance in said dipping tank, and means for trimming the product as it is discharged from said molding devices and before it is delivered from the machine.

20. In a machine of the class described, a rotatable wheel, a plurality of molding devices carried by said wheel, an individual oven for each of said molding devices, a set of burners beneath said wheel for heating said ovens as said molding devices are passed over said burners, a step-by-step mechanism for turning said wheel to bring said ovens into position over said burners to alternately apply heat to said molding devices first at one side of the ovens and then at the other side of the ovens.

21. In a machine of the character described, a rotatable wheel, a plurality of molding devices carried by said wheel, an individual oven for each of said molding devices, a set of burners beneath said wheel for alternately applying heat to said oven first at one side and then at the other side as said molding devices are carried over said burners during the turning of said wheel.

22. In a machine of the character described, a rotatable wheel, molding devices carried by said wheel and each of said molding devices including a pair of half mold sections that include die members, cores for said die members, an arm for supporting said cores, means for locking said half mold members together, means for releasing said locking means at times, means for restoring said locking means to their locking positions at times, means for locking said cores in said mold sections, means for releasing said core locking means at times, and means for restoring said core locking means to its locking position at other times.

23. In a machine of the character described, a rotatable wheel, molding devices carried by said wheel and each of said molding devices including a pair of half mold sections that include die members, cores for said die members, an arm for supporting said cores, means for locking said half mold members together, means for releasing said locking means at times, means for restoring said locking means to their locking positions at times, and means for lifting said cores in said mold sections before said half mold sections are opened and for holding said cores lifted until said half mold sections have been opened and again closed.

24. In a machine of the character described, a rotatable wheel, molding devices carried by said wheel and each of said molding devices including a pair of half mold sections that include die members, cores for said die members, an arm for supporting said cores, means for locking said half mold sections together, means for releasing said locking means at times, means for restoring said locking means to their locking positions at times, means for locking said cores in said mold sections, means for releasing said core locking means at times, means for restoring said core locking means to its locking position at other times, and means for lifting said cores in said mold sections.

25. In a machine of the character described, a rotatable wheel, molding devices carried by said wheel and each of said molding devices including a pair of half mold sections that include die members, cores for said die members, an arm for supporting said cores, means for locking said half mold members together, means for releasing said locking means at times, means for restoring said locking means to their locking positions at times, means for lifting said cores in said mold sections, and another means for wholly removing said cores from said mold sections and restoring said cores again to said mold sections.

26. In a machine of the character described, a rotatable wheel, molding devices carried by said wheel and each of said molding devices including a pair of half mold sections that include die members, cores for said die members, an arm for supporting said cores, means for locking said half mold sections together, means for releasing said locking means at times, means for restoring said locking means to their locking positions at times, means for locking said cores in said mold sections, means for releasing said core locking means at times, means for restoring said core locking means to its locking position at other times, means for lifting said cores in said mold sections, and another means for wholly removing said cores from said mold sections and restoring said cores again to said mold sections.

27. In a machine of the class described, a rotatable wheel, a plurality of molding devices each including removable cores carried by said wheels, a single dipping tank forming a loading place for all of said molding devices, and a means coöperative with said molding devices and said dipping tank for removing said cores from said molding devices, dipping them into said dipping tank and restoring them to said molding devices as said molding devices pass said dipping tank.

28. In a machine of the class described, a rotatable wheel, a plurality of molding devices carried by said wheel, a single loading mechanism for all of said molding devices, means coöperating with said molding devices and said loading mechanism for loading said molding devices as they pass said molding mechanism, said molding mechanism including a dipping tank, and said molding devices including removable cores to be dipped into said dipping tank, and means for supplying the moldable substance to said dipping tank.

29. In a machine of the class described, a molding device including a sectional mold and a core therefor, means for locking said mold sections together, means for locking said cores in said mold, means for engaging said core locking means to unlock said core at times, and means for lifting said cores in said mold after said core is unlocked.

30. In a machine of the class described, a molding device including a sectional mold and a core therefor, means for locking said mold sections together, means for locking said core in said mold, means for first unlocking said core and means for subsequently unlocking said mold sections, means for first relocking said mold sections and means for subsequently relocking said core, a dipping tank, and means for removing said core from said molds to dip it into said dipping tank and then restoring said core to said molds.

31. In a machine of the class described, a molding device including a sectional mold, and a core therefor, means for locking said mold sections together, means for locking said core in said mold, means for first unlocking said core and means for subsequently unlocking said mold sections, means for first relocking said mold sections, means for subsequently relocking said core, a dipping tank, means for removing said core from said molds to dip it into said dipping tank, and then restoring said core to said molds, after said molds have been relocked and before said core has been relocked.

32. In a machine of the class described, a molding device including a sectional mold and a core therefor, means for locking said mold sections together, means for locking said core in said mold, means for engaging said core locking means to unlock said core at times, other means engaging said core locking means for relocking said core at other times, and means for separating said mold sections when unlocked to discharge the contents thereof.

33. In a machine of the class described, a molding device including a sectional mold and a core therefor, means for locking said mold sections together, means for locking said core in said mold, means for first unlocking said core, means for subsequently lifting said core in said mold to disengage the molded product.

34. In a machine of the class described, a molding device including a sectional mold and a core therefor, means for locking said mold sections together, means for locking said core in said mold, means for first unlocking said core, means for subsequently lifting said cores in said mold to disengage the molded product, means for unlocking said mold sections, and means for separating said mold sections when unlocked to discharge the contents thereof.

35. In a machine of the class described, a molding device including a sectional mold and a core therefor, means for locking said mold sections together, means for locking said core in said mold, means for first unlocking said cores, means for subsequently lifting said core in said molds to disengage the molded product, means for unlocking said mold sections, means for separating said mold sections when unlocked to discharge the contents thereof, means for relocking said mold sections after the contents thereof have been discharged, means coöperating with said core for loading said mold after said mold sections have been relocked.

36. In a machine of the class described, a molding device including a sectional mold and a core therefor, means for locking said mold sections together, means for locking said core in said mold, means for first unlocking said core, means for subsequently lifting said core in said mold to disengage the molded product, means for unlocking said mold sections, means for separating said mold sections when unlocked to discharge the contents thereof, means for relocking said mold sections after the contents thereof have been discharged, means coöperating with said cores for loading said molds after said mold sections have been relocked, and means for relocking said core after said mold has been locked.

37. In a machine of the class described, a molding device including a sectional mold and a core therefor, means for locking said mold sections together, means for locking said cores in said mold, means for engaging said core locking means to unlock said core at times, other means engaging said core locking means for relocking said core at other times, means for separating said mold sections when unlocked to discharge the contents thereof, a trimming mechanism, and means for conveying the product discharged from said mold to said trimming mechanism, and means for subsequently conveying the trimmed product and discharging it from the machine.

38. In a machine of the class described, a mold, a core carrier, a core carried by said carrier for said mold, a dipping tank, means for engaging said core carrier to lift said core out of said mold and convey it to said dipping tank to dip the same.

39. In a machine of the class described, a mold, a core carrier, a core carried by said carrier for said mold, a dipping tank, means for engaging said core carrier to lift said core out of said mold and convey it to said dipping tank to dip the same, and to return said core to said mold after it has been dipped.

40. In a machine of the class described, a mold, a core carrier, and a core carried by said carrier for said mold, an oscillatable shaft, an arm on said shaft having means for engaging said core carrier to lift said core out of said mold, the radius of said arm and the arc of movement of the same being such as to remove said core out of and to one side of said mold.

41. In a machine of the class described, a mold, a core carrier, a core carried by said carrier for said mold, an oscillatable shaft, an arm on said shaft having means for engaging said core carrier to lift said core out of said mold and convey said core to a loading place, and means at said loading place for containing the moldable product and applying it to said core.

42. In a machine of the class described, a mold carrier, a female mold carried by said mold carrier, a core carrier, a core carried by said core carrier for said mold, said core carrier including a pivoted link and an arm pivoted to said link, said arm having a head to which said core is secured, and means for engaging said core carrier to first lift said core out of said mold and then convey it away from said mold.

43. In a machine of the class described, a mold carrier, a female mold carried by said mold carrier, a core carrier, a core carried by said core carrier for said mold, said core carrier including a pivoted link and an arm pivoted to said link, said arm having a head to which said core is secured, means for engaging said core carrier to first lift said core out of said mold and then convey it away from said mold, and subsequently returning said core to said mold.

44. In a machine of the class described, a mold carrier, a female mold carried by said mold carrier, a core carrier, a core carried by said core carrier for said mold, said core carrier including a pivoted link and an arm pivoted to said link, said arm having a head to which said core is secured, means engaging said core carrier for locking said core in said mold.

45. In a machine of the class described, a mold carrier, a female mold carried by said mold carrier, a core carrier, a core carried by said core carrier for said mold, said core carrier including a pivoted link and an arm pivoted to said link, said arm having a head to which said core is secured, means for engaging said core carrier for locking said core in said mold, and means coöperative with said locking means for unlocking said core from said mold.

46. In a machine of the class described, a mold carrier, a female mold carried by said mold carrier, a core carrier, a core carried by said core carrier for said mold, said core carrier including a pivoted link and an arm pivoted to said link, said arm having a head to which said core is secured, means for engaging said core carrier for locking said core in said mold, means coöperative with said locking means for unlocking said core from said mold, and means coöperative with said locking means for relocking said core in said mold.

47. In a machine of the class described, a mold carrier, a female mold carried by said mold carrier, a core carrier, a core carried by said core carrier for said mold, said core carrier including a pivoted link and an arm pivoted to said link, said arm having a head to which said core is secured, means for engaging said core carrier for locking said core in said mold, means coöperative with said locking means for unlocking said core from said mold, and means for engaging said core carrier to first lift said core out of said mold and then conveying it away from said mold.

48. In a machine of the class described, a mold carrier, a female mold carried by said mold carrier, a core carrier, a core carried by said core carrier for said mold, said core carrier including a pivoted link and an arm pivoted to said link, said arm having a head to which said core is secured, means for engaging said core carrier for locking said core in said mold, means coöperative with said locking means for unlocking said core from said mold, means for engaging said core carrier to first lift said core out of said mold and then conveying it away from said mold, a dipping tank into which said core is dipped by said last named means, said last named means having provisions for restoring said core to said mold when dipped.

49. In a machine of the class described, a mold carrier, a female mold carried by said mold carrier, a core carrier, a core carried by said core carrier for said mold, said core carrier including a pivoted link and an arm pivoted to said link, said arm being a head to which said core is secured, means for engaging said core carrier for locking said core in said mold, means coöperative with said locking means for unlocking said core from said mold, means for engaging said core carrier to first lift said core out of said mold and then conveying it away from said mold, a dipping tank into which said core is dipped by said last named means, said last named means having provisions for restoring said core to said mold when dipped, and means for relocking said core carrier after said core has been restored to said mold.

50. In a machine of the class described, a female mold carrier having a longitudinal slot, a link pivoted to move in said slot, a core carrying arm pivoted to said link, a core carried by said core carrying arm to enter said mold, a dipping tank, a mechanism for engaging said core carrying arm to lift said core out of said mold convey it to said dipping tank and then return it to said mold, and means engaging said link to counterbalance the weight of said link and its carried parts during the dipping operation.

51. In a machine of the class described, a sectional mold carrier having a slot between the sections thereof, female dies carried by said sections, a pivoted link operated in said slot, an arm carried by said link, a core carried by said arm for entering said female die, a latch device embracing said mold carrier adjacent to said slot to hold said sections together, and means controlling the operation of said latch on said mold sections.

52. In a machine of the class described, a sectional mold carrier having a slot between the sections thereof, female dies carried by said sections, a pivoted link operated in said slot, an arm carried by said link, a core carried by said arm for entering said female die, a latch device embracing said mold carrier adjacent to said slot to hold said sections together, means controlling the operation of said latch on said mold sections, and means for separating said mold sections when unlatched.

53. In a machine of the class described, a sectional mold carrier having a slot between the sections thereof, female dies carried by said sections, a pivoted link operated in said slot, an arm carried by said link, a core carried by said arm for entering said female die, a latch device embracing said mold carrier adjacent to said slot to hold said sections together, means controlling the operation of said latch on said mold sections, means for separating said mold sections when unlatched, and means for closing said mold sections.

54. In a machine of the class described, a sectional mold carrier having a slot between the sections thereof, female dies carried by said sections, a pivoted link operated in said slot, an arm carried by said link, a core carried by said arm for entering said female die, a latch device embracing said mold carrier adjacent to said slot to hold said sections together, means for controlling the operation of said latch on said mold sections, a latch engaging said core carrying arm to lock said core in said mold, and means controlling the operation of said last named latch on said arm.

55. In a machine of the class described, a dipping tank, a balanced pivoted frame in which said dipping tank is mounted, a reservoir in communication with said dipping tank, and means actuated by said pivoted frame for maintaining the contents of said dipping tank at a constant level.

56. In a machine of the class described, a dipping tank, a pivoted frame in which said dipping tank is mounted, a reservoir in communication with said dipping tank, means for maintaining the contents of said dipping tank at a constant level, said last named means comprising an automatically actuated valve device for controlling the flow from said reservoir to said dipping tank.

57. In a machine of the class described, a balanced frame, a tank carried thereby, said tank having an inlet spout, a reservoir, a pipe for conveying the contents of said reservoir into said spout, a valve controlling the passage through said pipe, and means for controlling said valve to maintain a constant level of the contents in said tank.

58. In a machine of the class described, a balanced frame, a tank carried thereby, said tank having an inlet spout, a reservoir, a pipe for conveying the contents of said reservoir into said spout, a valve controlling the passage through said pipe, means for controlling said valve to maintain a constant level of the contents in said tank, said last named means comprising operative connections between said valve and said tank in virtue of which as the level of the contents of said tank falls below a predetermined level said valve will be opened.

59. In a machine of the class described, a mold having a removable core and a core carrier for carrying said core, a dipping tank, an oscillatable shaft having an arm provided with a finger to engage said core carrier, means for turning said shaft to lift said core carrier and convey it over said dipping tank to lower said core carrier to project said core into said tank, and for then reversing the movement of said shaft to remove said core from said tank and restore it to said mold.

60. In a machine of the class described, a mold having a removable core and core carrier for carrying said core, a dipping tank, an oscillatable shaft having an arm provided with a finger to engage said core carrier, means for turning said shaft to lift said core carrier and convey it over said dipping tank to lower said core carrier to project said core into said dipping tank, and for then reversing the movement of said shaft to remove said core from said dipping tank and restore it to said mold, said last named means comprising a rocker frame, power transmitting mechanism between said rocker frame and said shaft, and means for rocking said rocker frame.

61. In a machine of the class described, a mold having removable core and core carrier for carrying said core, a dipping tank, an oscillatable shaft having an arm provided with a finger to engage said core carrier, means for turning said shaft to lift said core carrier and convey it over said dipping tank to lower said core carrier to project said core into said dipping tank, and for then revesing the movement of said shaft to remove said core from said dipping tank and restore it to said mold, said last named means comprising a rocker frame, power transmitting mechanism between said rocker frame and said shaft, means for rocking said rocker frame, said rocking means comprising a rotatable cam, and connections between said rocker frame and said cam, a main shaft on which said cam is mounted, and power supplying means for said main shaft.

62. In a machine of the class described, a rotatable wheel, molding devices carried by said wheels and including a core carrier and a removable core, and a mold into which said core is placed, a dipping tank, means for removing said core from said mold, dipping it into said dipping tank and again restoring it to said mold, means for imparting a step-by-step movement to said wheel, said last named means including a main shaft, and means for operating said core removing and restoring means from said main shaft.

63. In a machine of the class described, a rotatable wheel, molding devices carried by said wheel and including a core carrier and a removable core, and a mold into which said core is placed, a dipping tank, means for removing said core from said mold, dipping it into said dipping tank and again restoring it to said mold, means for imparting a step-by-step movement to said wheel, said last named means including a main shaft, means for operating said core removing and restoring means from said main shaft, means for opening said molding devices to discharge the molded product, a trimming mechanism into which the molded product so discharged is delivered, and means for operating said trimming mechanism from said main shaft.

64. In a machine of the class described, a trimming mechanism including a tube having its entrant end sharpened, a pivoted pusher for engaging the article to be trimmed and pushing it through said tube, means for delivering the article to be trimmed to said tube, and means for reciprocating said pivoted pusher at intervals to engage and disengage said tube.

65. In a machine of the class described, a trimming mechanism including a tube having its entrant end sharpened, a pivoted pusher for engaging the article to be trimmed and pushing it through said tube, means for delivering the article to be trimmed to said tube, means for reciprocating said pivoted pusher at intervals to engage and disengage said tube, said reciprocating means including a cam shaft, a conveyer passing around said cam shaft, and means for delivering the trimmed article from said tube onto said conveyer.

66. In a machine of the class described, a rotatable wheel, molding devices carried by said wheel, said molding devices each including a sectional mold and a core therefor, means for supporting said mold sections, means for opening and closing said mold sections at times, means for supporting said core and means for slightly lifting said core while said core remains in said mold sections before said mold sections are opened to thereby strip the molded product from said core.

67. In a machine of the class described, a rotatable wheel, molding devices carried by said wheel, said molding devices each including a sectional mold and a core therefor, means for supporting said mold sections, means for opening and closing said mold sections at times, means for supporting said core and means for lifting said core in said mold sections before said mold sections are opened to thereby strip the molded product from said core, and means for holding said core, after it has been lifted, to project into the molded product until said mold sections have been opened to discharge the molded product.

68. In a machine of the class described, a molding device including a sectional mold and a universally mounted core therefor, means for holding said mold sections together, means for holding said core in said mold, means for first releasing said core while holding said core to project into said mold to disengage the molded product therefrom, means for releasing said mold sections and then separating the same to discharge the contents thereof, and means for supplying raw material to said molds and core at intervals.

69. In a machine of the character stated, a rotatable structure including a set of molding devices, said set of molding devices comprising a sectional mold, and a core therefor, an arm pivoted on an axis in a plane at right angles to that containing the axis of rotation of the rotatable structure, means securing said core to said arm, means for opening and closing said sectional mold, means for moving said arm on its pivot to remove and restore the core from and to the sectional mold, means for supplying batter to said molding devices when said core is out of said mold, means for turning said rotatable structure, means for baking the batter in the mold, and means for discharging the contents of said mold.

70. In a machine of the class described, a female mold, a core therefor, a core carrier, and means for loosely swivelly mounting said core on said core carrier, and means for pivotally mounting said core carrier to move in the longitudinal plane of the mold and core as a whole.

FREDERICK A. BRUCKMAN.

Witnesses:
D. C. SOUTHWORTH,
FLOYD C. MILLER.